United States Patent [19]

Wilhelm et al.

[11] 3,953,556

[45] Apr. 27, 1976

[54] METHOD OF PREPARING URANIUM NITRIDE OR URANIUM CARBONITRIDE BODIES

[75] Inventors: Harley A. Wilhelm, Ames, Iowa; James K. McClusky, Valparaiso, Ind.

[73] Assignee: The United States of America as represented by the United States Energy Research and Development Administration, Washington, D.C.

[22] Filed: May 17, 1974

[21] Appl. No.: 470,897

Related U.S. Application Data

[63] Continuation-in-part of Ser. No. 323,185, Jan. 12, 1973, abandoned.

[52] U.S. Cl............................ 264/0.5; 252/301.1 R
[51] Int. Cl.².......................................... G21C 21/00
[58] Field of Search................ 264/.5; 252/301.1 R; 423/253, 254, 256

[56] References Cited

UNITED STATES PATENTS

| 3,306,957 | 2/1967 | McLaren .............................. 264/.5 |
| 3,386,811 | 6/1968 | Hanson............................ 423/256 X |
| 3,510,434 | 5/1970 | Weber et al. ................. 252/301.1 R |
| 3,527,578 | 9/1970 | Akimoto.............................. 423/254 |
| 3,856,622 | 12/1974 | Pollock et al............ 252/301.1 R X |

*Primary Examiner*—Samuel W. Engle
*Assistant Examiner*—Peter A. Nelson
*Attorney, Agent, or Firm*—Dean E. Carlson; Arthur A. Churm; James W. Weinberger

[57] ABSTRACT

Sintered uranium nitride or uranium carbonitride bodies having a controlled final carbon-to-uranium ratio are prepared, in an essentially continuous process, from $U_3O_8$ and carbon by varying the weight ratio of carbon to $U_3O_8$ in the feed mixture, which is compressed into a green body and sintered in a continuous heating process under various controlled atmospheric conditions to prepare the sintered bodies.

6 Claims, No Drawings

METHOD OF PREPARING URANIUM NITRIDE OR URANIUM CARBONITRIDE BODIES

CONTRACTUAL ORIGIN OF THE INVENTION

The invention described herein was made in the course of, or under, a contract with the UNITED STATES ATOMIC ENERGY COMMISSION.

This is a continuation-in-part of application Ser. No. 323,185 filed Jan. 12, 1973, and now abandoned.

BACKGROUND OF THE INVENTION

This invention relates to a method for preparing nuclear reactor fuel material. More specifically, this invention relates to a method for making sintered bodies of uranium nitride and uranium carbonitride. Still more specifically, this invention relates to an essentially continuous process for making sintered bodies of uranium nitride and uranium carbonitride having a controlled final carbon-to-uranium ratio.

The search for high-performance uranium and plutonium nuclear reactor fuels as alternates to the oxide fuels has concentrated on the nitrides and carbides. The interest in nitride fuels centers principally on the use of mixed nitrides, (U,Pu)N in fast breeder reactors and uranium mononitride which has major potential as a space reactor fuel. The potential of uranium nitride as a fuel is discussed in "Nitride Fuels: Properties and Potentials", by A. A. Bauer, Reactor Technology, Vol. 15, No. 2, Summer 1972.

Uranium nitirde, uranium carbide and uranium carbonitride can all be prepared by first preparing uranium metal and then reacting the metal with nitrogen, carbon or a combination of carbon and nitrogen. Thus, the preparation of any of these compounds generally requires that uranium metal must first be prepared before the compounds can be produced.

These compounds have been prepared from uranium dioxide; however, stoichiometry of uranium dioxide is difficult to control and maintain, thus making it difficult to control the final composition of the compounds produced therefrom.

Sintered bodies of uranium nitride or uranium carbonitride, suitable for use as fuels in nuclear reactors, may also be prepared by compacting uranium nitride or uranium carbonitride powder into pellets and sintering the pellets in an inert atmosphere of high purity. In order to obtain suitable sintered fuel pellets, it is necessary that the powders be ground to a very fine particle size. However, finely powdered uranium nitride and uranium carbonitride are so highly reactive that oxygen pickup from the atmosphere can result, so that it is necessary to grind the powders under very carefully controlled conditions, such as under a high-purity inert atmosphere with very low oxygen and water vapor contents. Once ground, the powders must continue to be handled in an inert atmosphere until the pellets are prepared and sintered in order to obtain a satisfactory product.

SUMMARY OF THE INVENTION

We have found that we can eliminate many of the problems enumerated above by using $U_3O_8$ as the uranium oxide starting material. We have found that we are able to prepare sintered uranium nitride and uranium carbonitride bodies having a controlled final carbon-to-uranium ratio in an essentially continuous process which eliminates almost any possibility of oxygen contamination of the final bodies. By essentially continuous process it is meant that once the charge has been prepared, pressed into a green body and placed in the furnace the body remains in the furnace under easily controlled conditions until preparation of the sintered body having the desired composition is complete, thus preventing a contamination of the body by the atmosphere.

By the method of the invention for preparing uranium nitride or carbonitride bodies having a controlled final carbon-to-uranium ratio, $U_3O_8$ is mixed with a predetermined amount of carbon to prepare a charge, the weight ratio of carbon to $U_3O_8$ in the charge being determined by the formula $C = 0.1027 + 0.0428X$ where X = atom ratio of carbon with respect to uranium in the final uranium nitride or carbonitride body; pressing the charge into a green body; heating the green body to about 1000°C. until the $U_3O_8$ in the body is reduced to uranium dioxide; heating the body under reduced pressure to about 1350°C. until the uranium dioxide is converted to UOC or UOC and UC; introducing a flowing atmosphere of nitrogen over the body and heating the body to about 1750°C. whereby the UOC is nitrided to uranium nitride; and heating the body to about 1900°C. in a vacuum, thereby removing any excess nitrogen which may be contained therein, and to complete sintering, thereby forming a sintered uranium nitride or carbonitride body having a controlled final carbon-to-uranium ratio.

It is therefore one object of the invention to provide a method for making sintered bodies of uranium nitride or uranium carbonitride.

It is a further object of the invention to provide a method for making sintered bodies of uranium nitride or carbonitride which reduces the possibility of oxygen contamination.

It is still another object of the invention to provide a method for making sintered bodies of uranium nitride or uranium carbonitride in which the sintered bodies have a controlled final carbon-to-uranium ratio.

Finally, it is the object of this invention to provide a method, which is essentially a continuous process, for making sintered uranium nitride or uranium carbonitride bodies which reduces the possibility of oxygen contamination and in which the bodies have a controlled final carbon-to-uranium ratio.

DETAILED DESCRIPTION OF THE INVENTION

These and other objects of the invention may be met by mixing $U_3O_8$ with a predetermined amount of carbon to prepare a charge, the weight ratio of carbon to $U_3O_8$ in the charge being determined by the formula $C = 0.1027 + 0.0428X$ where X = atom ratio of carbon with respect to uranium in the final uranium nitride or carbonitride body, pressing the charge at a pressure of at least about 10,000 pounds per square inch to form a green body, placing the green body in a furnace, heating the body in the furance under a flowing inert atmosphere to about 1000°C., thereby reducing the $U_3O_8$ in the body to $UO_2$, heating the body under reduced pressure to at least 1350°C. for a period of time sufficient to convert the $UO_2$ to UOC or to UOC plus UC, introducing an atmosphere of flowing nitrogen over the body and heating the body to at least 1750°C. until the UOC is nitrided to uranium nitride, and heating the body to about 1900°C. under reduced pressure to remove any excess nitrogen which may be present and to complete sintering, thereby forming a sintered uranium nitride or carbonitride body having a controlled final carbon-to-uranium ratio.

The charge is prepared by thoroughly mixing $U_3O_8$ and carbon. It is important that the $U_3O_8$ used in this method by finely divided so that it will be reduced to a uranium dioxide which is "active" or has a "high ceramic activity".

Finely divided $U_3O_8$ can be prepared by several methods using different starting materials. For example, production-grade $UO_3$ can be used as a starting material by mixing it with water and grinding to dissolve any water-soluble uranium compounds contained therein and to form a slurry. Excess ammonium hydroxide is added to precipitate any soluble uranium as ammonium diuranate (ADU), the water is removed and the $UO_3$ and ADU are heated at a low temperature to decompose the mixture to $U_3O_8$ which is finely divided. Finely divided $U_3O_8$ can also be prepared by the thermal decomposition of ADU alone in air or by comminution of a coarse $U_3O_8$.

The carbon used to prepare the charge can be any allotropic form of pure carbon as powder, although graphite is generally preferred since it has good density, acts as a binder to hold the charge in the desired shape and also acts as a lubricant within the powder and for the die. The weight ratio of carbon to $U_3O_8$ in the charge is determined by the formula $C = 0.1207 + 0.0428X$ where $X =$ the atom ratio of carbon with respect to uranium in the desired uranium nitride or uranium carbonitride. The formula was derived by determining that the weight ratio of carbon to $U_3O_8$ necessary to produce UN is 0.1027 and that each 0.25% increase in the atom ratio of carbon to uranium desired in the final uranium carbonitride body increases the weight ratio of carbon to $U_3O_8$ by 0.0107. Thus, the weight ratio of carbon to $U_3O_8$ to produce UC is $0.1027 + 0.0428 = 0.14555$. The amount of carbon which will be supplied by the use of the above formula is slightly in excess of that amount of experimentally required reductant for stoichiometric removal of all oxygen. Since oxygen is undesirable in nuclear fuel elements with carbon, the slight excess of carbon is to assure very low oxygen content in the finished product.

Although pressures of 31,000 pounds per square inch were used to press the $U_3O_8$-carbon mixture into the green bodies, pressures as low as about 10,000 pounds per square inch were found to be satisfactory for this purpose.

After the green body has been formed, it is placed in a furnace and heated to a sufficient temperature and for a sufficient period of time to reduce the $U_3O_8$ in the charge to uranium dioxide. Generally, this requires a temperature of at least about 700°C., although heating to about 1000°C. is preferred to insure that the reaction is complete. It is preferred that this initial heating take place in an inert atmosphere such as in nitrogen, argon or helium which may be flowing in order to carry off the CO and $CO_2$ produced by the reduction of the $U_3O_8$ to $UO_2$. The initial heating may also take place under reduced pressure if the green body is small enough so that, as the exothermic reaction takes place, it does not destroy the body. In this step, the reduced pressure need be only slightly under atmospheric to insure that the reduction reaction to $UO_2$ is completed. Upon completion of the reduction of the $U_3O_8$ to uranium dioxide in the body, the body is further heated to a temperature of at least about 1350°C. and preferably to about 1550°C. under pressure of not more than about 1 mm of mercury until the uranium dioxide in the body is converted to UOC or UOC plus UC. Reduction of the uranium dioxide to UOC or to UOC plus UC will depend upon the amount of carbon which had been mixed with the $U_3O_8$. Thus, if sufficient carbon was mixed with $U_3O_8$ to produce a final product of uranium nitride, then all of the uranium dioxide will be converted to UOC. However, if sufficient additional carbon was added to produce a final product of uranium carbide, this uranium carbide is formed at this time. If an intermediate amount of carbon was mixed with the $U_3O_8$ in the initial charge, the body will now comprise a mixture of UOC and UC.

The time necessary to complete the reactions depends upon the size of body. Time for reaction to go to completion can be determined by the evolution of gases from the reaction. For the small compact of the example, the total process time from cold furnace to nitrogen atmosphere was about one hour.

After conversion of the uranium dioxide to UOC or to UOC plus UC is complete, but body is further heated to a temperature of at least about 1750°C. in an atmosphere of flowing nitrogen whereby the UOC present in the body is nitrided to uranium nitride. The temperature at which the nitride may be produced can go as high as about 1850°C. After completion of the nitriding step, the body is further heated to a temperature of about 1900°C. under reduced pressure in order to remove any excess nitrogen which may be present in the compound and to finally sinter the body, thereby forming a sintered uranium nitride or uranium carbonitride body having a controlled final carbon-to-uranium ratio. After the sintered bodies have been prepared, they should then be cooled in a vacuum or in an inert atmosphere of argon or helium to prevent any contamination from oxygen or nitrogen in the atmosphere.

EXAMPLE

A UN compact was prepared by intimately mixing 19.63 grams of $U_3O_8$ and 2.02 grams of powdered graphite to form a charge which was then pressed at a pressure of about 31,000 pounds per square inch to form a green body. The green body was placed in a graphite crucible which was then inserted in a heat-insulated graphite susceptor for induction heating. The charged crucible susceptor was heated in a silica tube. A vacuum of about $1.6 \times 10^{-4}$ Torr was established in the furnace and heating was commenced. The charge was heated slowly to about 915°C. with evolution of most of the $CO_2$ and some of the CO. As the temperature was increased past 1250°C., more CO was evolved and the formation of UOC began. At about 1750°C., formation of UOC was essentially complete and nitrogen gas was flowed into the furnace, reacting with the UOC to form UN and evolving more CO. After about 80 minutes the furnace was shut off, the system was evacuated and the compact was allowed to cool in a vacuum. Examination revealed a dense compact having a shiny gray metallic appearance, although the compact did appear to contain some unknown red flecks. Analysis of the compact indicated <100 ppm oxygen was present.

While it is preferred that the process be carried out in a single furnace to minimize the possibility of contamination by the atmosphere, it is obvious that the process of the invention can be carried out by using two or more furnaces instead of just one. For example, the $U_3O_8$ and carbon green body can be heated in a resistance furnace to carry out the reduction reaction up to 1000°C. The body can then be transferred under carefully controlled conditions to an induction furnace or other high-temperature furnace to carry out the completion of the process.

It can be seen from the preceding discussion and example that the process of the invention provides a simple and effective method for producing sintered uranium nitride and uranium carbonitride bodies having a predetermined carbon-to-uranium ratio in a single continuous process.

The embodiments of the invention in which an exclusive property or privilege is claimed are defined as follows:

1. A method of preparing sintered uranium nitride or uranium carbonitride bodies having controlled final carbon-to-uranium ratio in a single furnace comprising:
   a. mixing $U_3O_8$ with a predetermined amount of carbon to prepare a charge, the weight ratio of carbon to $U_3O_8$ in the charge being determined by the formula $C = 0.1027 + 0.0428X$, where X = atom ratio of carbon with respect to uranium in the final uranium nitride or uranium carbonitride body;
   b. compacting the charge into a green body;
   c. heating the green body to about 1000°C. until the $U_3O_8$ in the body is reduced to $UO_2$;
   d. heating the body under reduced pressure to about 1350°C. until the uranium dioxide is converted to UOC or to UOC plus UC;
   e. heating the body under a flowing atmosphere of nitrogen to about 1750°C. whereby the UOC is nitrided to uranium nitride; and
   f. heating the body to about 1900°C. under reduced pressure whereby excess nitrogen is removed and the body is sintered, thereby forming a sintered uranium nitride or uranium carbonitride body having a controlled final carbon-to-uranium ratio.

2. The process of claim 1 wherein the green body is heated under reduced pressure.

3. The process of claim 1 wherein the green body is heated in an inert atmosphere.

4. The process of claim 3 wherein the inert atmosphere is flowing and is selected from the group consisting of nitrogen, argon and helium.

5. The process of claim 4 wherein the $UO_2$ body is heated under a pressure of not more than about 1 mm of mercury to from about 1350°C. to about 1550°C.

6. The process of claim 5 wherein the body of UOC or UOC and UC is further heated to from about 1750°C. to about 1850°C.

* * * * *